US012627528B2

(12) United States Patent
Anderson et al.

(10) Patent No.: US 12,627,528 B2
(45) Date of Patent: *May 12, 2026

(54) CLOUD-BASED CALL ROUTING

(71) Applicant: Zoom Communications, Inc., San Jose, CA (US)

(72) Inventors: Walter F. C. Anderson, Santa Cruz, CA (US); Benjamin Joseph DeStephen, Hilliard, OH (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,548

(22) Filed: Nov. 9, 2023

(65) Prior Publication Data

US 2024/0073061 A1      Feb. 29, 2024

Related U.S. Application Data

(63) Continuation of application No. 17/162,215, filed on Jan. 29, 2021.

(51) Int. Cl.
| | |
|---|---|
| *H04L 12/66* | (2006.01) |
| *H04L 65/1104* | (2022.01) |
| *H04M 9/00* | (2006.01) |

(52) U.S. Cl.
CPC .......... *H04L 12/66* (2013.01); *H04L 65/1104* (2022.05); *H04M 9/002* (2013.01)

(58) Field of Classification Search
CPC ..... H04L 12/66; H04L 65/1104; H04M 9/002

USPC ......................................................... 370/352
See application file for complete search history.

(56) References Cited

U.S. PATENT DOCUMENTS

| | | | |
|---|---|---|---|
| 8,040,873 B2 | 10/2011 | Wengrovitz et al. | |
| 10,264,129 B2 | 4/2019 | Bischoff et al. | |
| 2007/0058639 A1* | 3/2007 | Khan | H04L 65/1106 |
| | | | 370/522 |
| 2011/0255675 A1* | 10/2011 | Jasper | H04M 3/523 |
| | | | 379/265.09 |
| 2015/0381666 A1* | 12/2015 | Rustogi | H04M 7/006 |
| | | | 370/352 |
| 2017/0279760 A1 | 9/2017 | Li et al. | |
| 2018/0205829 A1* | 7/2018 | Bischoff | H04L 65/1046 |
| 2019/0320070 A1* | 10/2019 | Adams | H04L 65/1069 |

FOREIGN PATENT DOCUMENTS

| | | |
|---|---|---|
| EP | 2485147 A2 | 8/2012 |

* cited by examiner

*Primary Examiner* — Jirapon Tulop

(57) ABSTRACT

A system includes a network and a telephony server. The network is associated with an independent carrier (IC), a native carrier, or both. The network includes a telephone gateway, an internet gateway, a first device associated with the IC, and a second device associated with the native carrier. The first device communicates with the telephone gateway. The second device communicates with the internet gateway. The telephony server is associated with the native carrier. The telephony server supports traffic from the first device and the second device. The telephony server includes a PBX and a session border controller (SBC). The SBC communicates with the telephone gateway via a session initiation protocol (SIP) trunk.

20 Claims, 11 Drawing Sheets

CLOUD-BASED CALL ROUTING

CROSS-REFERENCE TO RELATED APPLICATION(S)

This application is a continuation of U.S. patent application Ser. No. 17/162,215, filed Jan. 29, 2021, the entire disclosure of which is hereby incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for cloud-based private branch exchanges (PBXs).

One aspect of this disclosure is a UCaaS system. The UCaaS system may include a customer network and a telephony server. The customer network may be associated with an independent carrier (IC), a native carrier, or both. The customer network may include a call manager, a telephone gateway, an internet gateway, a first device associated with the IC, and a second device associated with the native carrier. The telephone gateway may be communicatively coupled to the call manager. The first device may be configured to communicate with the telephone gateway via the call manager. The second device may be configured to communicate with the internet gateway. The telephony server may be associated with the native carrier. The telephony server may be configured to support traffic from the first device and the second device. The telephony server may include a PBX and a session border controller (SBC). The SBC may be communicatively coupled to the PBX. The SBC may be configured to communicate with the telephone gateway via a session initiation protocol (SIP) trunk.

Another aspect of this disclosure is a method for routing a call over a UCaaS system. The method may include initiating the call via a non-native device. The non-native device may be associated with a customer network. The method may include routing the call through a telephone gateway of the customer network. The method may include routing the call from the telephone gateway to an SBC of a telephony server associated with a native network via a SIP trunk.

Another aspect of this disclosure is a method for routing a call over a UCaaS system. The method may include initiating a call via a native device. The native device may be associated with a customer network, a native network, or both. The method may include routing the call through an internet gateway of the customer network. The method may include routing the call from the internet gateway to an SBC of a telephony server associated with the native network. The method may include routing the call from the SBC to a telephone gateway associated with the customer network via a SIP trunk.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Enterprise customers have long relied upon on-premises PBXs to deliver phone communications over voice over internet protocol (VoIP), integrated services digital network (ISDN), and analog approaches. Example on-premises PBX systems include Cisco call managers and Via call managers. In recent years, cloud-based PBX approaches, or simply cloud PBXs, have been introduced to implement traditional PBX functionality in a virtual manner. Thus, rather than relying upon large hardware solutions on-site, cloud PBX customers may use data center hardware to achieve the same call routing and other functionality of a conventional PBX.

Most customers who upgrade to a cloud PBX system for telephony services do so in phases rather than all at once. For example, many customers upgrade to a cloud PBX system on a department-by-department basis or at one office at a time. Upgrading in phases typically requires those customers to have both a cloud PBX and a legacy PBX with separate processing and routing, given that conventional cloud PBX systems do not support legacy phone number assignments and carrier support. Having separate PBXs can cause problems such as compatibility issues between services, potential differences in call quality between native and non-native phones, and the like. In the examples described herein, native devices may be devices that are natively configured to operate via a telephony server associated with a native carrier. Non-native devices may be devices that are not natively configured to operate via the telephony server associated with the native carrier. Non-native devices may also be referred to as legacy devices.

Implementations of this disclosure address problems such as these using a hybrid system based on a cloud PBX that is configured to route calls between various combinations of native devices and non-native devices.

Figure 1:
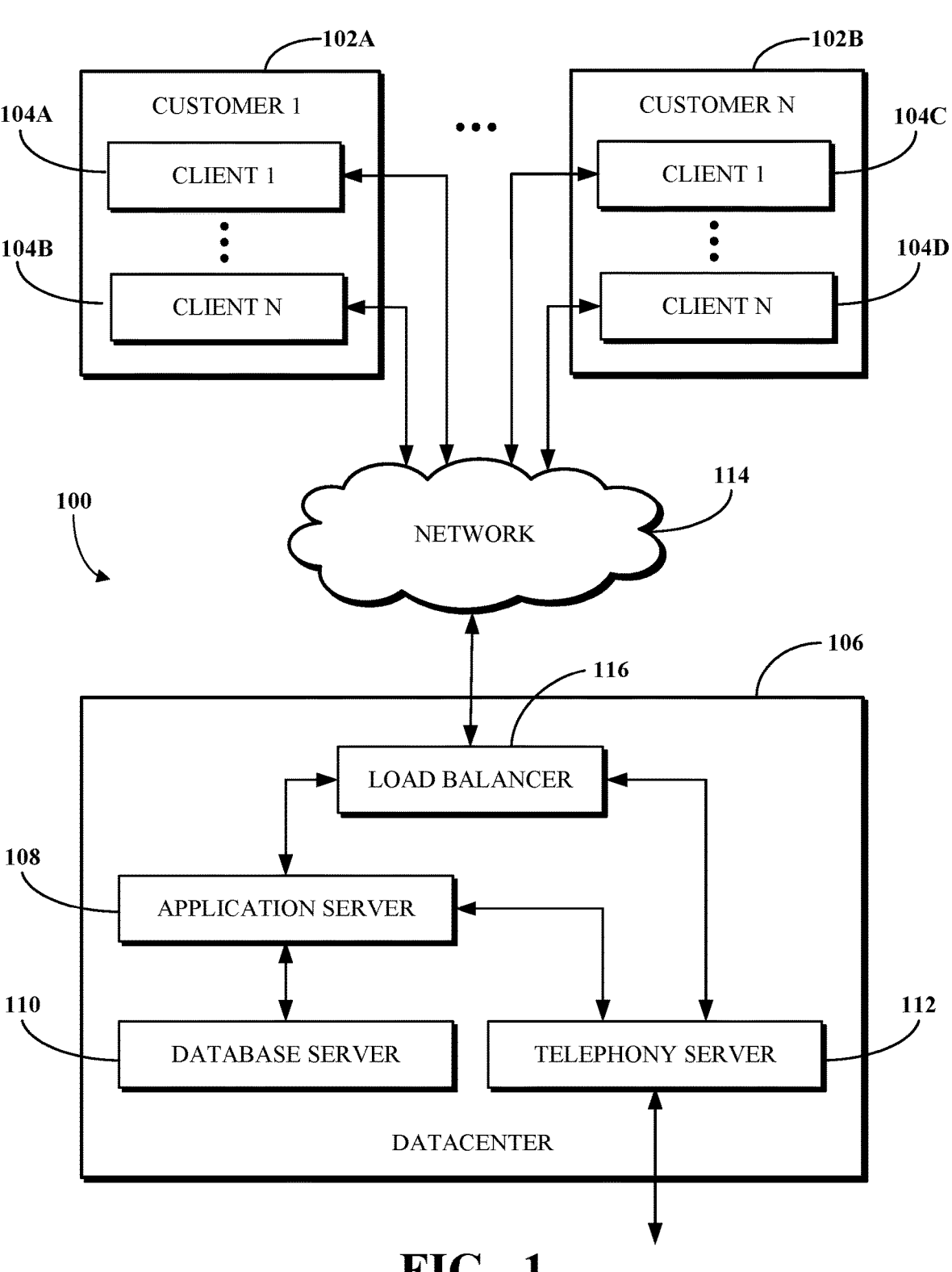
FIG. 1 is a block diagram of an example of an electronic computing and communications system.

To describe some implementations in greater detail, reference is first made to examples of hardware and software structures used to implement a cloud-based PBX. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be VoIP-enabled devices configured to send and receive calls over a network, for example, a network 114. In particular, the telephony server 112 includes a SIP zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based PBX system.

The SIP zone receives telephony traffic from a client of a customer and directs same to a destination device. The SIP zone may include one or more call switches for routing the telephony traffic. For example, to route a VoIP call from a first VoIP-enabled client of a customer to a second VoIP-enabled client of the same customer, the telephony server 112 may initiate a SIP transaction between a first client and the second client using a PBX for the customer. However, in another example, to route a VoIP call from a VoIP-enabled client of a customer to a client or non-client device (e.g., a desktop phones which is not configured for VoIP communication) which is not VoIP-enabled, the telephony server 112 may initiate a SIP transaction via a VoIP gateway that transmits the SIP signal to a public switched telephone network (PSTN) system for outbound communication to the non-VoIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106.

Figure 2:
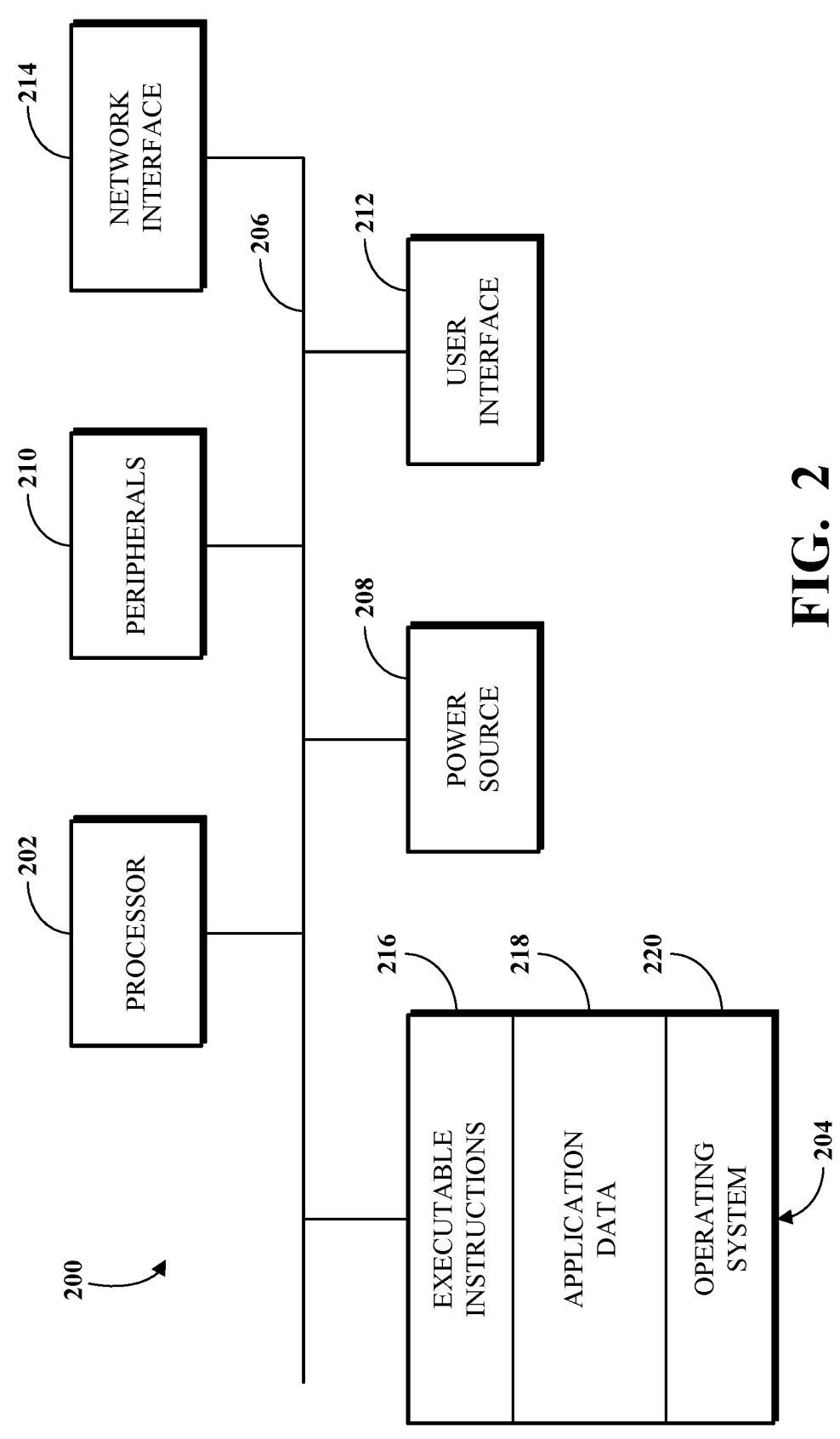
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
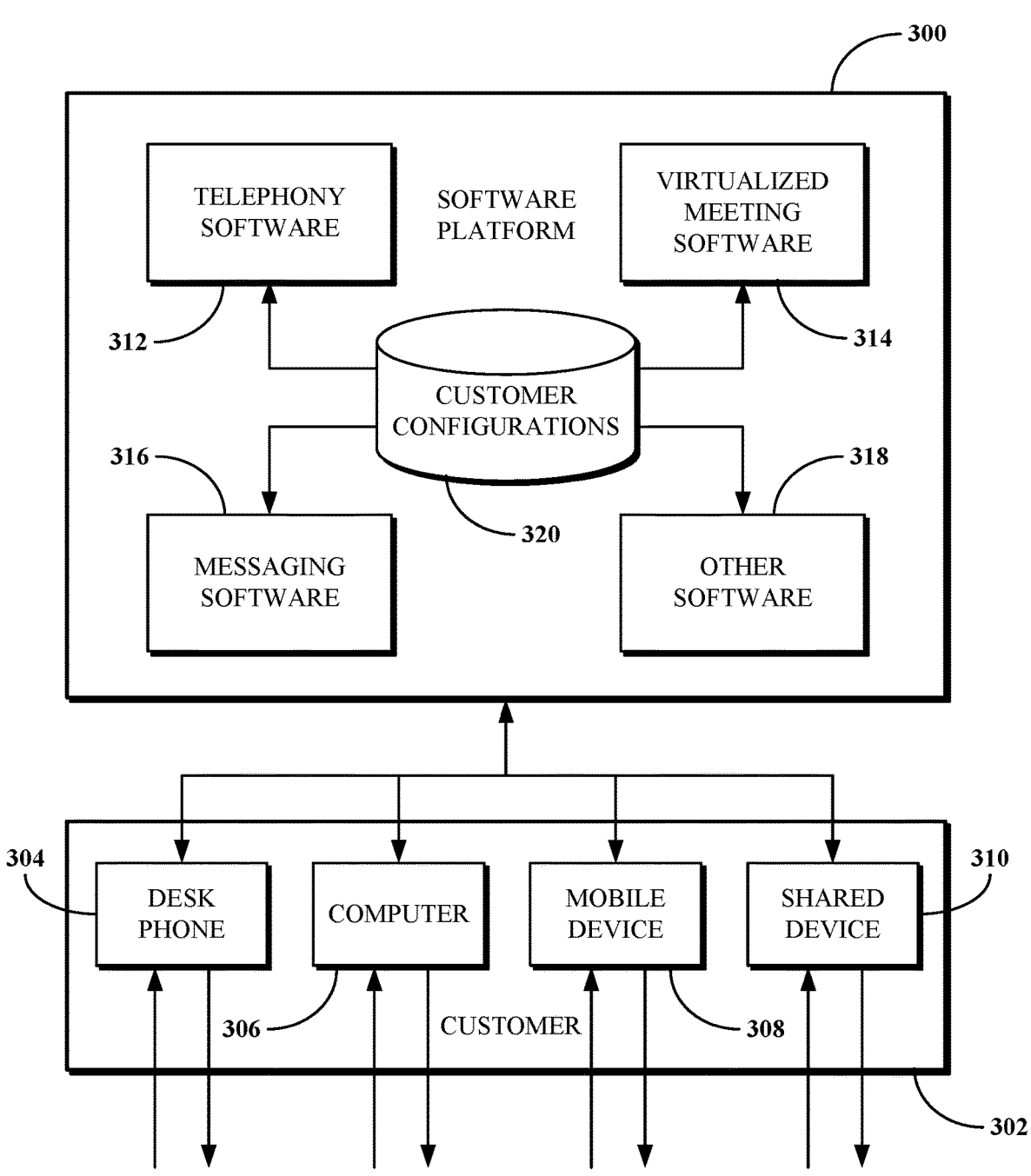
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, virtualized meeting software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VoIP-enabled clients of the customer 302, non-VoIP-enabled devices of the customer 302, VoIP-enabled clients of another customer, non-VoIP-enabled devices of another customer, or other VoIP-enabled clients or non-VoIP-enabled devices. For example, the telephony software 312 may be implemented using one or more both of an application server and a telephony server, such as the application server 108 and the telephony server 112 shown in FIG. 1. Calls sent or received using the telephony software 312 may, for example, be sent or received using the desk phone 304, a softphone running on the computer 306, a mobile application running on the mobile device 308, or using the shared device 310 where same includes telephony features.

The virtualized meeting software 314 enables audio, video, and/or other forms of virtualized meetings between multiple devices, such as to facilitate a conference between the users of those devices. The virtualized meeting software 314 can include functionality for hosting, presenting scheduling, joining, or otherwise participating in a virtualized meeting. The virtualized meeting software 314 may further include functionality for recording some or all of a virtualized meeting and/or documenting a transcript for the virtualized meeting.

The messaging software 316 enables instant messaging, unified messaging, and other types of messaging communications between multiple devices, such as to facilitate a chat or like virtual conversation between users of those devices.

The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can be implemented on a UCaaS system that is configured to handle traffic from native and non-native devices.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a virtualized meeting. In yet another example, the virtualized meeting software 314 may include functionality for sending and receiving instant messages between participants and/or other users of the customer 302. In yet another example, the virtualized meeting software 314 may include functionality for file sharing between participants and/or other users of the customer 302. In some implementations, some or all of the software 312 through 318 may be combined into a single software application run on clients of the customer, such as one or more of the clients 304-310.

Figure 4A:
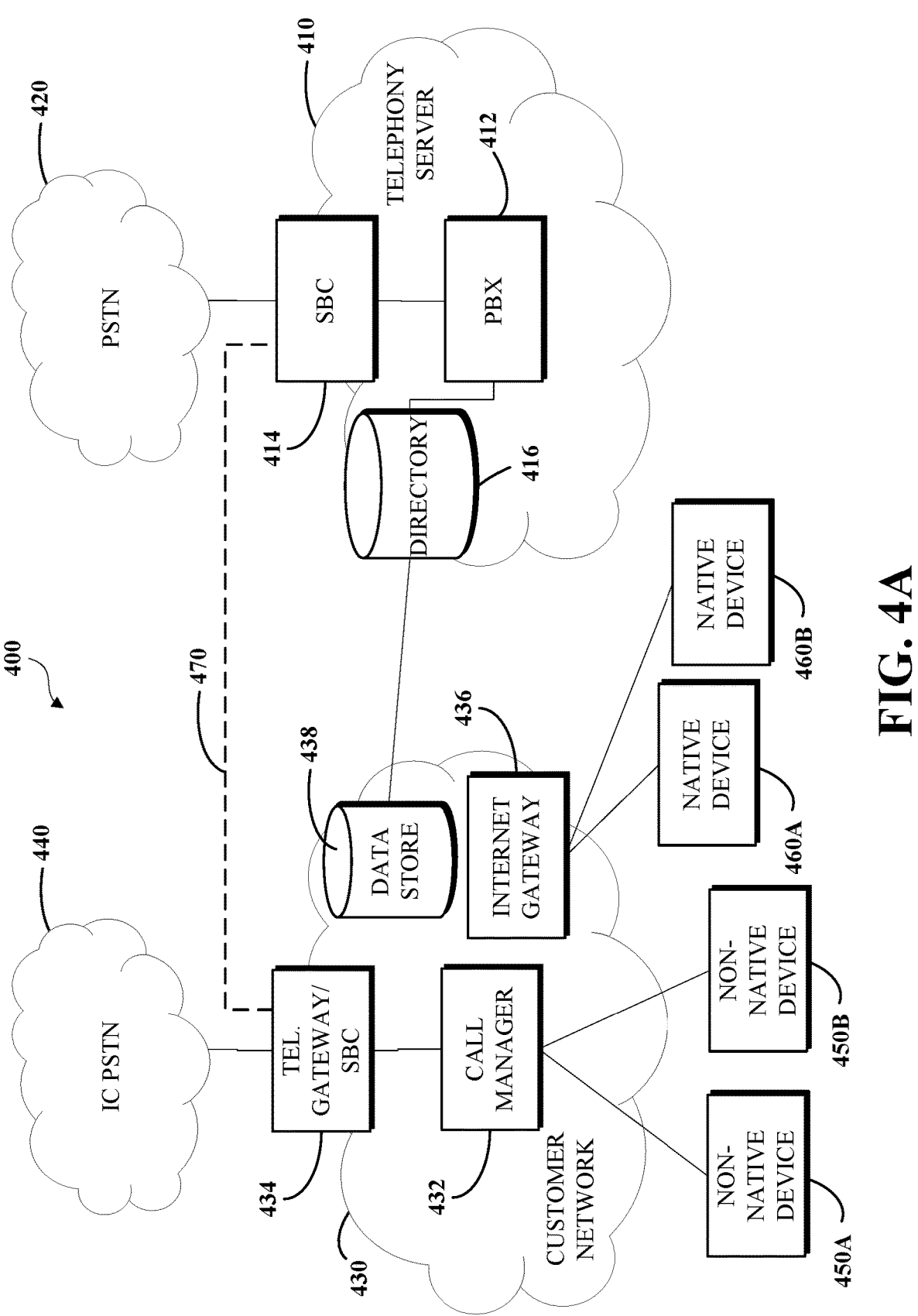
FIG. 4A is a block diagram of an example of a native device hybrid system.

FIG. 4A is a block diagram of an example of a native device hybrid system 400. The native device hybrid system 400 may be implemented on a UCaaS platform. The native device hybrid system 400 includes a telephony server 410, a PSTN 420 associated with the telephony server 410, a customer network 430, and an IC PSTN 440 associated with the customer network 430.

The telephony server 410 may be the telephony server 112 shown in FIG. 1. The telephony server 410 includes a PBX 412, which may be a cloud-based PBX system, an SBC 414, and a data store shown as directory 416. As shown in FIG. 4A, the PBX 412 is communicatively coupled to the SBC 414 and the directory 416. The directory 416 may be configured to store and manage the device extensions of the native devices of the customer network 430. The SBC 414 can act as an intermediary to transmit and receive SIP requests and responses between clients (i.e., native) or non-client (i.e., non-native) devices of a given customer with clients or non-client devices external to that customer. The SBC 414 is communicatively coupled to the PBX 412 and the PSTN 420. The PSTN 420 may support a native carrier associated with the telephony server 410.

The customer network 430 may be associated with an IC, a native carrier, or both. The customer network 430 includes a call manager 432, a telephone gateway/SBC 434, an internet gateway 436, and a data store 438 for storing user directory information, such as an identity provider (IDP) or active directory (AD). The data store 438 may be configured to store and manage the device extensions of the non-native devices of the customer network 430. The data store 438 may be configured to synchronize data with the directory 416 to manage the device extensions of the native devices of the customer network 430. The synchronization may be performed manually or via an integration with the IDP or AD. As shown in FIG. 4A, the call manager 432 is communicatively coupled to non-native devices 450A, 450B. The call manager 432 may be a third party call control, a unified communications manager, or the like. One call manager is shown for simplicity and clarity, and it is understood that multiple call managers may be implemented, for example for multiple premise customers such as customers having a call manager for North American extensions and another call manager for Eastern European extensions. Non-native devices 450A, 450B may be non-native phones that are non-VoIP-enabled devices. The non-native devices 450A, 450B may be referred to as legacy devices or legacy phones of the customer network 430. Two non-native devices 450A, 450B are shown for simplicity and clarity, and it is understood that the customer network 430 may include any number of non-native devices. The internet gateway 436 is communicatively coupled to native devices 460A, 460B. The internet gateway 436 may be a VoIP gateway device that uses internet protocols to transmit and receive voice communications. Native devices 460A, 460B may be associated with telephony server 410. Two native devices 460A, 460B are shown for simplicity and clarity, and it is understood that the customer network 430 may include any number of non-native devices. Native devices 460A, 460B may be VoIP-enabled devices, and may be associated with a native carrier. The native devices 460A, 460B may be any one of the desk phone 304, the computer 306, the mobile device 308, or the shared device 310 shown in FIG. 3.

The telephone gateway/SBC 434 is communicatively coupled to the IC PSTN 440 and the call manager 432. The IC PSTN 440 may support a non-native carrier associated with the customer network 430. Examples of non-native carriers may include AT&T, Verizon, and the like. As shown in FIG. 4A, the SBC 414 and the telephone gateway/SBC 434 may communicate via SIP trunk 470. For simplicity and clarity, FIG. 4A is shown with one SIP trunk 470 and it is understood that the native device hybrid system 400 may include multiple SIP trunks, and the SIP trunks may be grouped into a SIP group to identify which SIP trunk to use for a given non-native device/number/extension. The SIP trunk 470 may be used for IC and hybrid routing and will be discussed in further detail using the figures and examples below. The directory 416 and data store 438 are synchronized to create a unified directory to manage non-native devices 450A, 450B and native devices 460A, 460B on the customer network 430. The unified directory may be used to support a native device having multiple phone numbers, for example an extension number to use for internal calls within the customer network, one phone number associated with the PSTN 420 to use for a call with a native device, and a different phone number associated with the IC PSTN 440 to use for a call with a non-native device.

Figure 4B:
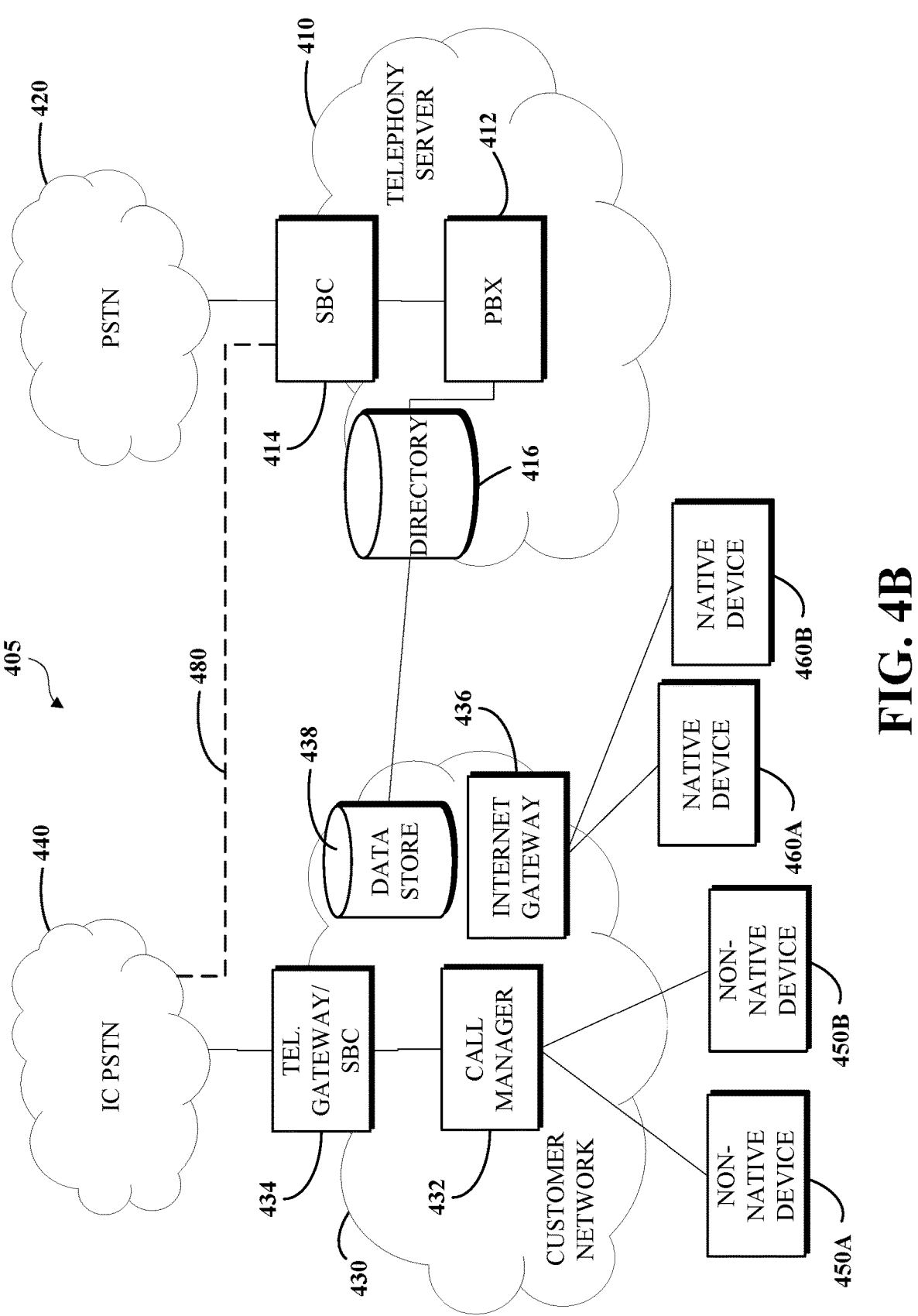
FIG. 4B is a block diagram of another example of a native device hybrid system.

FIG. 4B is a block diagram of another example of a native device hybrid system 405. The native device hybrid system 405 may be implemented on a UCaaS platform. The native device hybrid system 405 includes a telephony server 410, a PSTN 420 associated with the telephony server 410, a customer network 430, and an IC PSTN 440 associated with the customer network 430. One customer network is shown for simplicity and clarity. It is understood that the native device hybrid system 405 may include multiple customer networks that are communicatively coupled to the IC PSTN 440 via respective telephone gateways/SBCs.

The telephony server 410 may be the telephony server 112 shown in FIG. 1. The telephony server 410 includes a PBX 412, which may be a cloud-based PBX system, an SBC 414, and a data store shown as directory 416. As shown in FIG. 4B, the PBX 412 is communicatively coupled to the SBC 414 and the directory 416. The directory 416 may be configured to store and manage the device extensions of the native devices of the customer network 430. The SBC 414 can act as an intermediary to transmit and receive SIP requests and responses between clients (i.e., native) or non-client (i.e., non-native) devices of a given customer with clients or non-client devices external to that customer. The SBC 414 is communicatively coupled to the PBX 412 and the PSTN 420. The PSTN 420 may support a native carrier associated with the telephony server 410.

The customer network 430 may be associated with an IC, a native carrier, or both. The customer network 430 includes a call manager 432, a telephone gateway/SBC 434, an internet gateway 436, and a data store 438 for storing user directory information, such as an IDP or AD. The data store 438 may be configured to store and manage the device extensions of the non-native devices of the customer network 430. The data store 438 may be configured to synchronize data with the directory 416 to manage the device extensions of the native devices of the customer network 430. The synchronization may be performed manually or via an integration with the IDP or AD. As shown in FIG. 4B, the call manager 432 is communicatively coupled to non-native devices 450A, 450B. The call manager 432 may be a third party call control, a unified communications manager, or the like. One call manager is shown for simplicity and clarity, and it is understood that multiple call managers may be implemented, for example for multiple premise customers such as customers having a call manager for North American extensions and another call manager for Eastern European extensions. Non-native devices 450A, 450B may be non-native phones that are non-VoIP-enabled devices. The non-native devices 450A, 450B may be referred to as legacy devices or legacy phones of the customer network 430. Two non-native devices 450A, 450B are shown for simplicity and clarity, and it is understood that the customer network 430 may include any number of non-native devices. The internet gateway 436 is communicatively coupled to native devices 460A, 460B. The internet gateway 436 may be a VoIP gateway device that uses internet protocols to transmit and receive voice communications. Native devices 460A, 460B may be associated with telephony server 410. Two native devices 460A, 460B are shown for simplicity and clarity, and it is understood that the customer network 430 may include any number of non-native devices. Native devices 460A, 460B may be VoIP-enabled devices, and may be associated with a native carrier. The native devices 460A, 460B may be any one of the desk phone 304, the computer 306, the mobile device 308, or the shared device 310 shown in FIG. 3.

The telephone gateway/SBC 434 is communicatively coupled to the IC PSTN 440 and the call manager 432. The IC PSTN 440 may support a non-native carrier associated with the customer network 430. Examples of non-native carriers may include AT&T, Verizon, and the like. As shown in FIG. 4B, the SBC 414 and the IC PSTN 440 may communicate via SIP trunk 480. For simplicity and clarity, FIG. 4B is shown with one SIP trunk 480 and it is understood that the native device hybrid system 405 may include multiple SIP trunks, and the SIP trunks may be grouped into a SIP group to identify which SIP trunk to use for a given non-native device/number/extension. The SIP trunk 480 may be used for IC and hybrid routing and will be discussed in further detail using the figures and examples below. The SBC 414 may transmit SIP messages over the SIP trunk 480 to the IC PSTN 440. In a multiple customer network example, the SIP messages may include a SIP header to differentiate between different customer networks. For example, the SIP header may include information associated with a destination customer network such that the IC PSTM 440 may route the call to the customer network indicated in the SIP header.

The directory 416 and data store 438 are synchronized to create a unified directory to manage non-native devices 450A, 450B and native devices 460A, 460B on the customer network 430. The unified directory may be used to support a native device having multiple phone numbers, for example an extension number to use for internal calls within the customer network, one phone number associated with the PSTN 420 to use for a call with a native device, and a different phone number associated with the IC PSTN 440 to use for a call with a non-native device.

One or more embodiments disclosed herein may use routing rules to control where telephony traffic is routed. The routing rules may provide the ability for a subscriber who dials an extension number that is associated with a non-native PBX, such as the call manager 432, via the SIP trunk 470 to have the call handled using the routing rules. For example, the routing rule may indicate that if the subscriber dials a five digit extension not found in the directory 416, then three additional digits may be appended to the five digit extension and change the caller identification (ID) information before routing the call over the SIP trunk 470.

Figure 5:
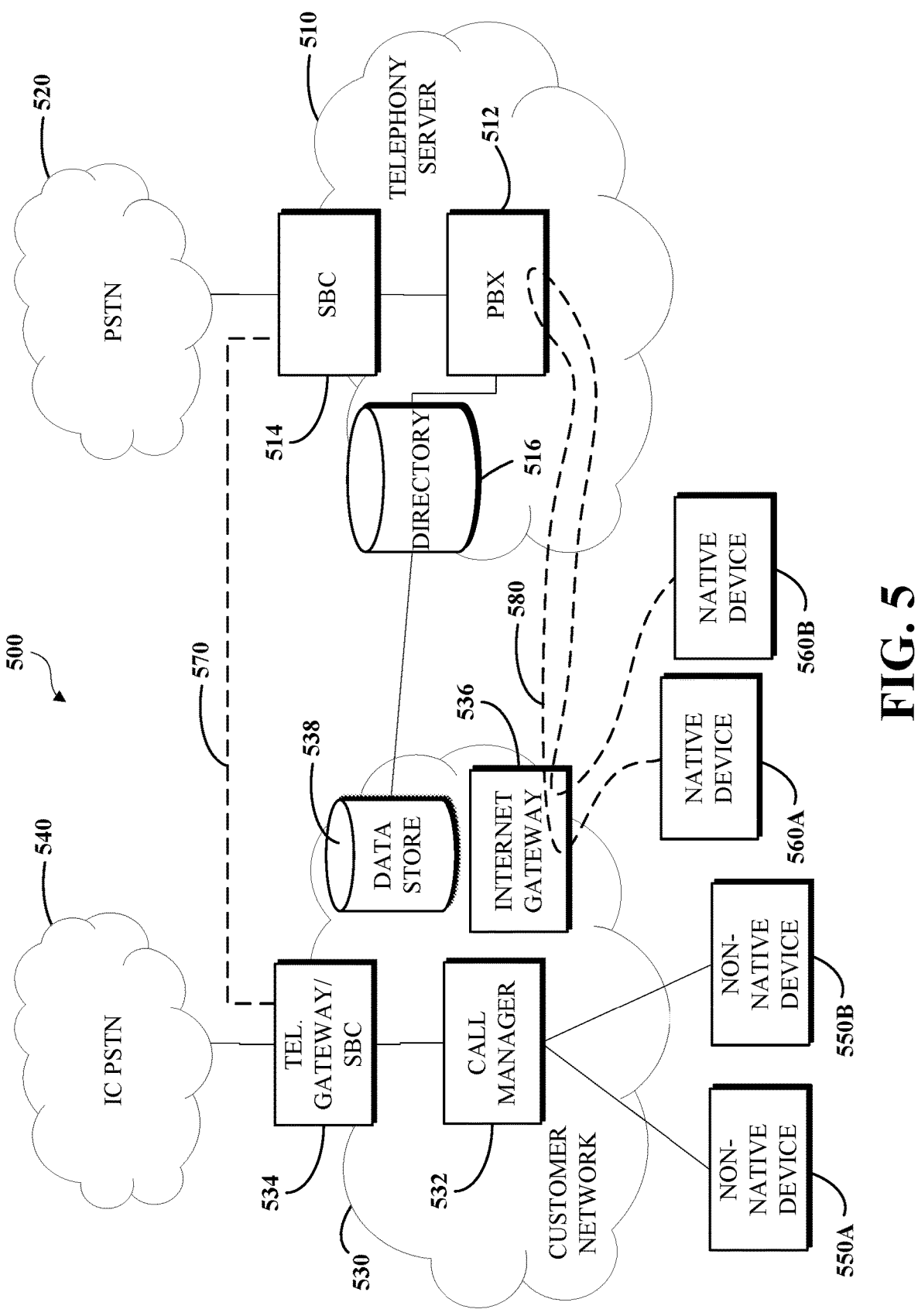
FIG. 5 is a block diagram of an example of a native device hybrid system configured to route a call from a native device to another native device.

FIG. 5 is a block diagram of an example of a native device hybrid system 500 configured to rout a call from a native device to another native device. The native device hybrid system 500 may be implemented in connection with a UCaaS platform. The native device hybrid system 500 may be the native device hybrid system 400 shown in FIG. 4A or the native device hybrid system 405 shown in FIG. 4B. As shown in FIG. 5, the native device hybrid system 500 includes a telephony server 510, a PSTN 520 associated with the telephony server 510, a customer network 530, and an IC PSTN 540 associated with the customer network 530.

The telephony server 510 may be the telephony server 112 shown in FIG. 1. The telephony server 510 includes a PBX 512, which may be a cloud-based PBX system, an SBC 514, and a data store shown as directory 516. The directory 516 may be configured to store and manage the device extensions of the native devices of the customer network 530. The PBX 512 may be referred to as a native PBX. As shown in FIG. 5, the PBX 512 is communicatively coupled to the SBC 514 and the directory 516. The SBC 514 can act as an intermediary to transmit and receive SIP requests and responses between clients (i.e., native) or non-client (i.e., non-native) devices of a given customer with clients or non-client devices external to that customer. The SBC 514 is communicatively coupled to the PBX 512 and the PSTN 520. The PSTN 520 may support a native carrier associated with the telephony server 510.

The customer network 530 may be associated with an IC, a native carrier, or both. The customer network 530 includes a call manager 532, a telephone gateway/SBC 534, an internet gateway 536, and a data store 538, such as an IDP or AD. The data store 538 may be configured to store and manage the device extensions of the non-native devices of the customer network 530. The data store 538 may be configured to synchronize data with the directory 516 to manage the device extensions of the native devices of the customer network 530. The synchronization may be performed manually or via an integration with the IDP or AD. As shown in FIG. 5, the call manager 532 is communicatively coupled to non-native devices 550A, 550B. The call manager 532 may be a third party call control, a unified communications manager, or the like. One call manager is shown for simplicity and clarity, and it is understood that multiple call managers may be implemented, for example for multiple premise customers such as customers having a call manager for North American extensions and another call manager for Eastern European extensions. Non-native devices 550A, 550B may be non-native phones that are non-VoIP-enabled devices. The non-native devices 550A, 550B may be referred to as legacy devices or legacy phones of the customer network 530. Two non-native devices 550A, 550B are shown for simplicity and clarity, and it is understood that the customer network 530 may include any number of non-native devices. The internet gateway 536 is communicatively coupled to native devices 560A, 560b. The internet gateway 536 may be a VoIP gateway device that uses internet protocols to transmit and receive voice communications. Native devices 560A, 560b may be associated with telephony server 510. Two native devices 560A, 560b are shown for simplicity and clarity, and it is understood that the customer network 530 may include any number of non-native devices. Native devices 560A, 560b may be VoIP-enabled devices, and may be associated with a native carrier. The native devices 560A, 560B may be any one of the desk phone 304, the computer 306, the mobile device 308, or the shared device 310 shown in FIG. 3.

The telephone gateway/SBC 534 is communicatively coupled to the IC PSTN 540 and the call manager 532. The IC PSTN 540 may support any non-native carrier associated with the customer network 530. Examples of non-native carriers may include AT&T, Verizon, and the like. As shown in FIG. 5, the SBC 514 and the telephone gateway/SBC 534 may communicate via SIP trunk 570. For simplicity and clarity, FIG. 5 is shown with one SIP trunk 570 and it is understood that the native device hybrid system 500 may include multiple SIP trunks, and the SIP trunks may be grouped into a SIP group to identify which SIP trunk to use for a given non-native device/number/extension. The SIP trunk 570 may be used for IC and hybrid call routing. The directory 516 and data store 538 are synchronized to create a unified directory to manage non-native devices 550A, 550B and native devices 560A, 560B on the customer network 530. The unified directory may be used to support a native device having multiple phone numbers, for example an extension number to use for internal calls within the customer network, one phone number associated with the PSTN 520 to use for a call with a native device, and a different phone number associated with the IC PSTN 540 to use for a call with a non-native device.

In the example shown in FIG. 5, native device 560A may initiate a call with native device 560B. The native devices 560A, 560B are configured to connect over the internet and obtain their dial tone and services from the PBX 512. As shown in FIG. 5, a call is placed by native device 560A and routed via communication channel 580 through the internet gateway 536 to the PBX 512 and back to the internet gateway 536 to the native device 560B.

Figure 6:
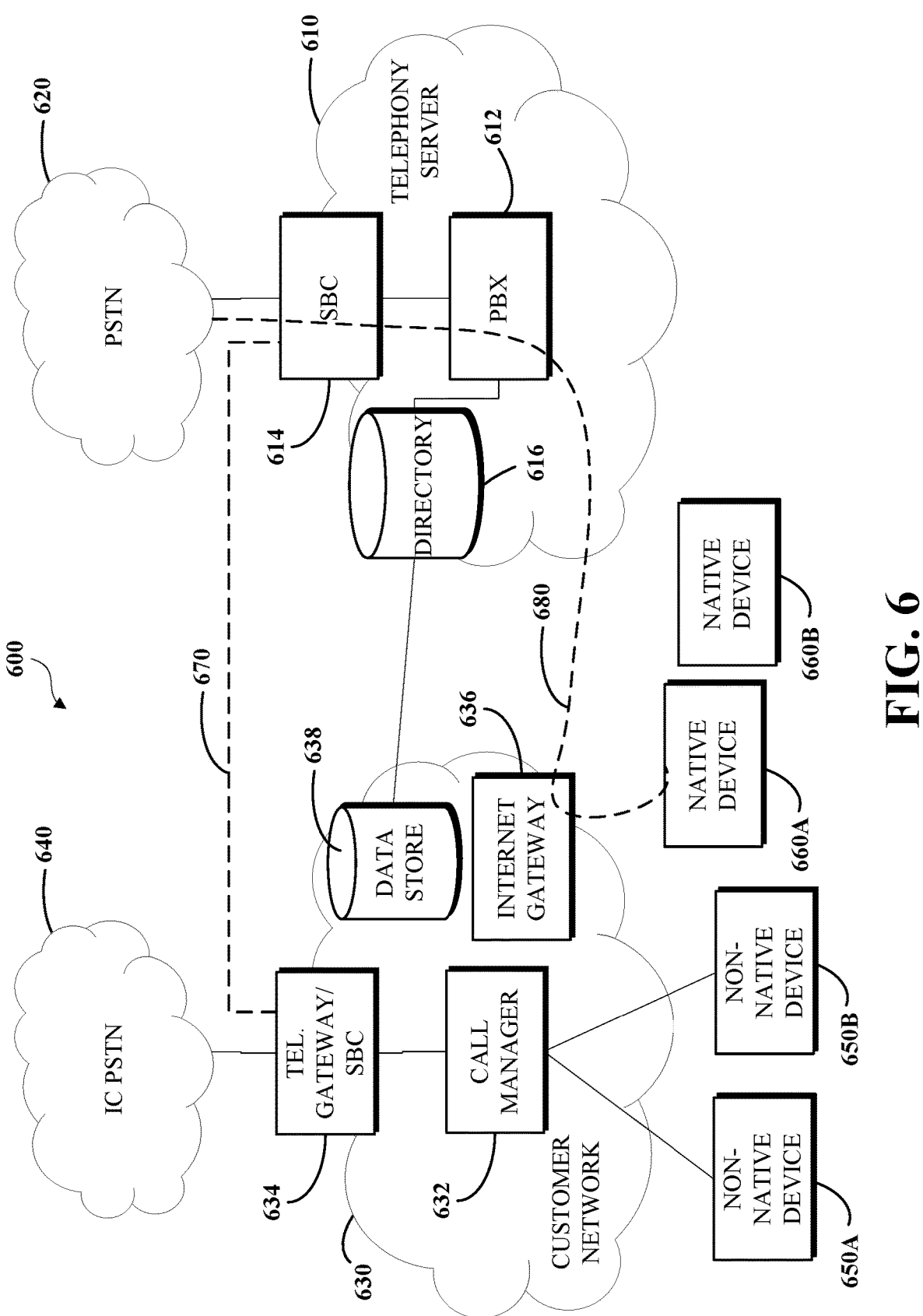
FIG. 6 is a block diagram of an example of a native device hybrid system configured to route a call from a native device to an external device.

FIG. 6 is a block diagram of an example of a native device hybrid system 600 configured to route a call from a native device to an external device. The native device hybrid system 600 may be implemented on a UCaaS platform. The native device hybrid system 600 may be the native device hybrid system 400 shown in FIG. 4A or the native device hybrid system 405 shown in FIG. 4B. As shown in FIG. 6, the native device hybrid system 600 includes a telephony server 610, a PSTN 620 associated with the telephony server 610, a customer network 630, and an IC PSTN 640 associated with the customer network 630.

The telephony server 610 may be the telephony server 112 shown in FIG. 1. The telephony server 610 includes a PBX 612, which may be a cloud-based PBX system, an SBC 614, and a data store shown as directory 616. The directory 616 may be configured to store and manage the device extensions of the native devices of the customer network 630. The PBX 612 may be referred to as a native PBX. As shown in FIG. 6, the PBX 612 is communicatively coupled to the SBC 614 and the directory 616. The SBC 614 can act as an intermediary to transmit and receive SIP requests and responses between clients (i.e., native) or non-client (i.e., non-native) devices of a given customer with clients or non-client devices external to that customer. The SBC 614 is communicatively coupled to the PBX 612 and the PSTN 620. The PSTN 620 may support a native carrier associated with the telephony server 610.

The customer network 630 may be associated with an IC, a native carrier, or both. The customer network 630 includes a call manager 632, a telephone gateway/SBC 634, an internet gateway 636, and a data store 638, such as an IDP or AD. The data store 638 may be configured to store and manage the device extensions of the non-native devices of the customer network 630. The data store 638 may be configured to synchronize data with the directory 616 to manage the device extensions of the native devices of the customer network 630. The synchronization may be performed manually or via an integration with the IDP or AD. As shown in FIG. 6, the call manager 632 is communicatively coupled to non-native devices 650A, 650B. The call manager 632 may be a third party call control, a unified communications manager, or the like. One call manager is shown for simplicity and clarity, and it is understood that multiple call managers may be implemented, for example for multiple premise customers such as customers having a call manager for North American extensions and another call manager for Eastern European extensions. Non-native devices 650A, 650B may be non-native phones that are non-VoIP-enabled devices. The non-native devices 650A, 650B may be referred to as legacy devices or legacy phones of the customer network 630. Two non-native devices 650A, 650B are shown for simplicity and clarity, and it is understood that the customer network 630 may include any number of non-native devices. The internet gateway 636 is communicatively coupled to native devices 660A, 660B. The internet gateway 636 may be a VoIP gateway device that uses internet protocols to transmit and receive voice communications. Native devices 660A, 660B may be associated with telephony server 610. Two native devices 660A, 660B are shown for simplicity and clarity, and it is understood that the customer network 630 may include any number of non-native devices. Native devices 660A, 660B may be VoIP-enabled devices, and may be associated with a native carrier. The native devices 660A, 660B may be any one of the desk phone 304, the computer 306, the mobile device 308, or the shared device 310 shown in FIG. 3.

The telephone gateway/SBC 634 is communicatively coupled to the IC PSTN 640 and the call manager 632. The IC PSTN 640 may support any non-native carrier associated with the customer network 630. Examples of non-native carriers may include AT&T, Verizon, and the like. As shown in FIG. 6, the SBC 614 and the telephone gateway/SBC 634 may communicate via SIP trunk 670. For simplicity and clarity, FIG. 6 is shown with one SIP trunk 670 and it is understood that the native device hybrid system 600 may include multiple SIP trunks, and the SIP trunks may be grouped into a SIP group to identify which SIP trunk to use for a given non-native device/number/extension. The SIP trunk 670 may be used for IC and hybrid call routing. The directory 616 and data store 638 are synchronized to create a unified directory to manage non-native devices 650A, 650B and native devices 660A, 660B on the customer network 630. The unified directory may be used to support a native device having multiple phone numbers, for example an extension number to use for internal calls within the customer network, one phone number associated with the PSTN 620 to use for a call with a native device, and a different phone number associated with the IC PSTN 640 to use for a call with a non-native device.

In the example shown in FIG. 6, native device 560A may initiate a call with an external device (not shown) that is not associated with the customer network 630. The native device 560A is configured to connect over the internet and obtain its dial tone and services from the PBX 612. As shown in FIG. 6, a call is placed by native device 660A and routed via communication channel 680 through the internet gateway 636 to the PBX 612 and SBC 614, and then to the external device via the PSTN 620.

Native subscribers may have many PSTN options. For example, a native subscriber may have a native number or the native subscriber may port an existing non-native number to the native platform, for example software platform 300 shown in FIG. 3. In an example where the native subscriber ports an existing number to the native platform, all calls from the native device may be routed through the PSTN 620.

Figure 7:
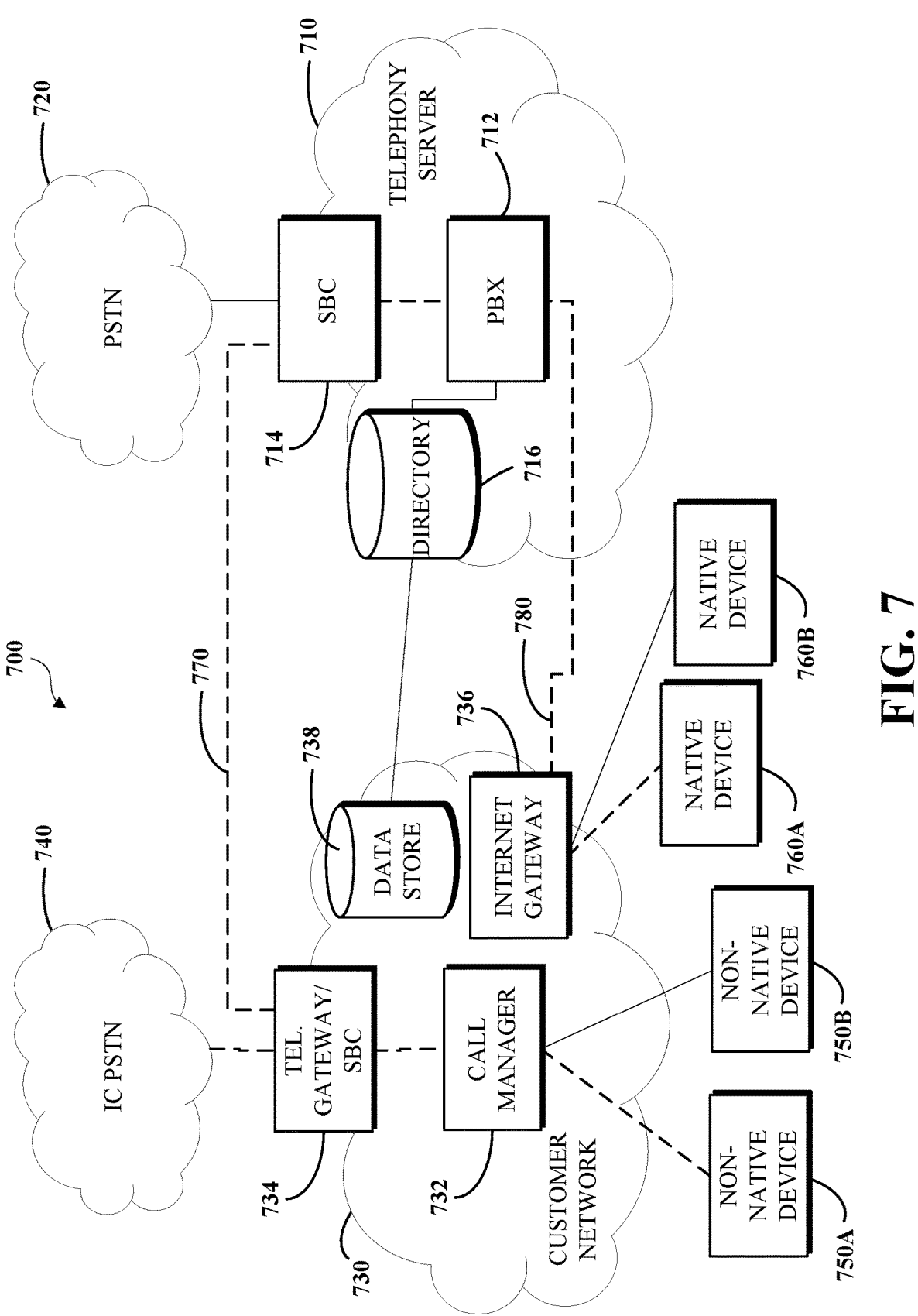
FIG. 7 is a block diagram of an example of a native device hybrid system configured to route a call for a native device with a non-native carrier number.

FIG. 7 is a block diagram of an example of a native device hybrid system 700 configured to route a call for a native device with a non-native carrier number. The native device hybrid system 700 may be implemented on a UCaaS platform. The native device hybrid system 700 may be the native device hybrid system 400 shown in FIG. 4A or the native device hybrid system 405 shown in FIG. 4B. As shown in FIG. 7, the native device hybrid system 700 includes a telephony server 710, a PSTN 720 associated with the telephony server 710, a customer network 730, and an IC PSTN 740 associated with the customer network 730.

The telephony server 710 may be the telephony server 112 shown in FIG. 1. The telephony server 710 includes a PBX 712, which may be a cloud-based PBX system, an SBC 714, and a data store shown as directory 716. The directory 716 may be configured to store and manage the device extensions of the native devices of the customer network 730. The PBX 712 may be referred to as a native PBX. As shown in FIG. 7, the PBX 712 is communicatively coupled to the SBC 714 and the directory 716. The SBC 714 can act as an intermediary to transmit and receive SIP requests and responses between clients (i.e., native) or non-client (i.e., non-native) devices of a given customer with clients or non-client devices external to that customer. The SBC 714 is communicatively coupled to the PBX 712 and the PSTN 720. The PSTN 720 may support a native carrier associated with the telephony server 710.

The customer network 730 may be associated with an IC, a native carrier, or both. The customer network 730 includes a call manager 732, a telephone gateway/SBC 734, an internet gateway 736, and a data store 738, such as an IDP or AD. The data store 738 may be configured to store and manage the device extensions of the non-native devices of the customer network 730. The data store 738 may be configured to synchronize data with the directory 716 to manage the device extensions of the native devices of the customer network 730. The synchronization may be performed manually or via an integration with the IDP or AD. As shown in FIG. 7, the call manager 732 is communicatively coupled to non-native devices 750A, 750B. The call manager 732 may be a third party call control, a unified communications manager, or the like. One call manager is shown for simplicity and clarity, and it is understood that multiple call managers may be implemented, for example for multiple premise customers such as customers having a call manager for North American extensions and another call manager for Eastern European extensions. Non-native devices 750A, 750B may be non-native phones that are non-VoIP-enabled devices. The non-native devices 750A, 750B may be referred to as legacy devices or legacy phones of the customer network 730. Two non-native devices 750A, 750B are shown for simplicity and clarity, and it is understood that the customer network 730 may include any number of non-native devices. The internet gateway 736 is communicatively coupled to native devices 760A, 760B. The internet gateway 736 may be a VoIP gateway device that uses internet protocols to transmit and receive voice communications. Native devices 760A, 760B may be associated with telephony server 710. Two native devices 760A, 760B are shown for simplicity and clarity, and it is understood that the customer network 730 may include any number of non-native devices. Native devices 760A, 760B may be VoIP-enabled devices, and may be associated with a native carrier. The native devices 760A, 760B may be any one of the desk phone 304, the computer 306, the mobile device 308, or the shared device 310 shown in FIG. 3.

The telephone gateway/SBC 734 is communicatively coupled to the IC PSTN 740 and the call manager 732. The IC PSTN 740 may support any non-native carrier associated with the customer network 730. Examples of non-native carriers may include AT&T, Verizon, and the like. As shown in FIG. 7, the SBC 714 and the telephone gateway/SBC 734 may communicate via SIP trunk 770. For simplicity and clarity, FIG. 7 is shown with one SIP trunk 770 and it is understood that the native device hybrid system 700 may include multiple SIP trunks, and the SIP trunks may be grouped into a SIP group to identify which SIP trunk to use for a given non-native device/number/extension. The SIP trunk 770 may be used for IC and hybrid call routing. The directory 716 and data store 738 are synchronized to create a unified directory to manage non-native devices 750A, 750B and native devices 760A, 760B on the customer network 730. The unified directory may be used to support a native device having multiple phone numbers, for example an extension number to use for internal calls within the customer network, one phone number associated with the PSTN 720 to use for a call with a native device, and a different phone number associated with the IC PSTN 740 to use for a call with a non-native device.

In the example shown in FIG. 7, native device 760A may have a non-native carrier number. Native device 760A may initiate a call with non-native device 750A or an external device (not shown) that is not associated with the customer network 730. The native device 760A is configured to connect over the internet and obtain its dial tone and services from the PBX 712. As shown in FIG. 7, a call is placed by native device 760A and routed via communication channel 780 through the internet gateway 736 to the PBX 712 and SBC 714. From the SBC 714, the call may be routed to the telephone gateway/SBC 734 via the SIP trunk 770. If the PSTN destination of the call is an external device that is not associated with the customer network 730, the telephone gateway/SBC 734 is configured to route the call to the IC PSTN 740. If the PSTN destination of the call is an internal destination, such as non-native device 750A, the telephone gateway/SBC 734 is configured to route the call to the non-native device 750A through the call manager 732.

Figure 8:
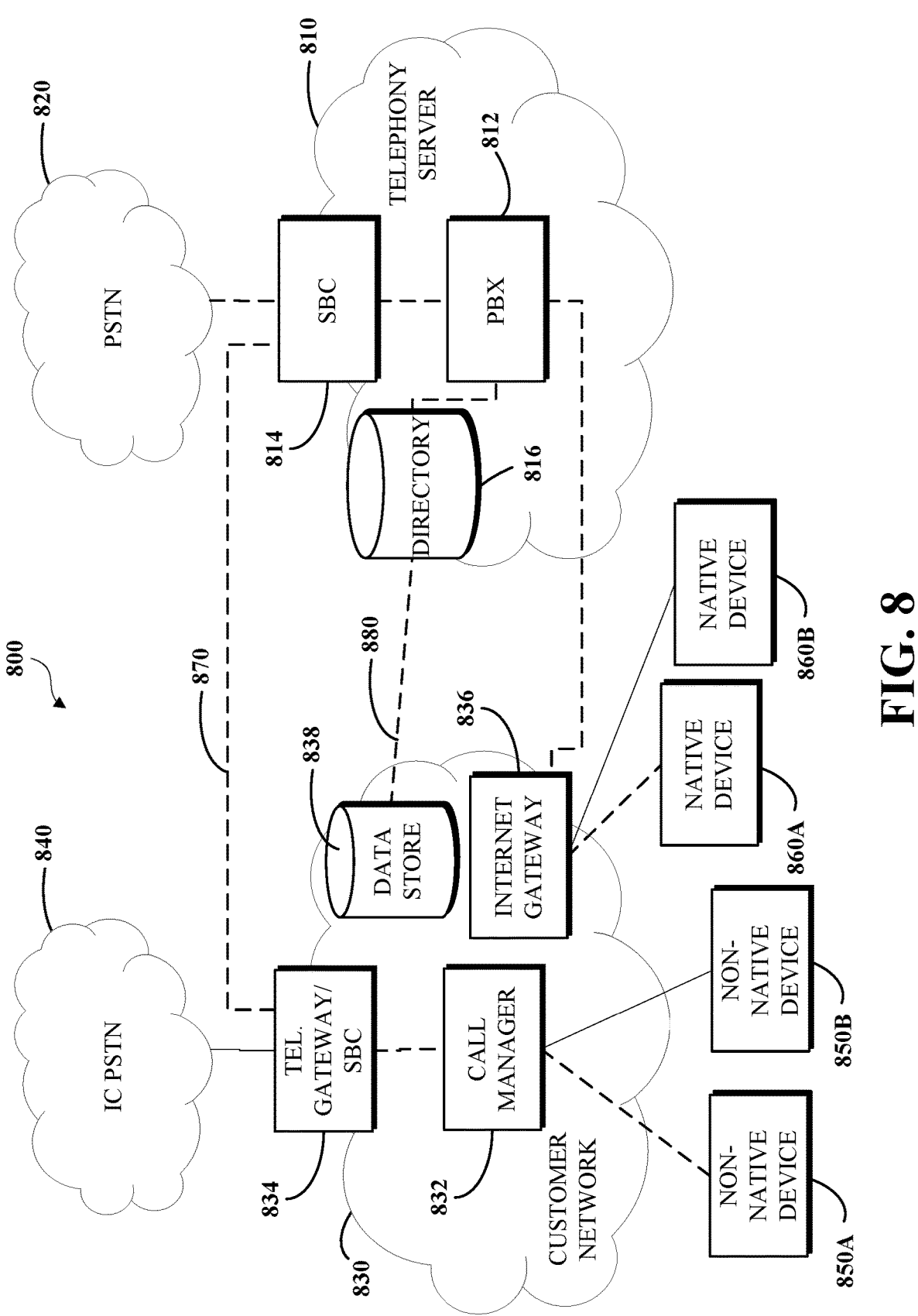
FIG. 8 is a block diagram of is a block diagram of an example of a native device hybrid system configured to route a call for non-native device.

FIG. 8 is a block diagram of is a block diagram of an example of a native device hybrid system 800 configured to route a call for non-native device. The native device hybrid system 800 may be implemented on a UCaaS platform. The native device hybrid system 800 may be the native device hybrid system 400 shown in FIG. 4A or the native device hybrid system 405 shown in FIG. 4B. As shown in FIG. 8, the native device hybrid system 800 includes a telephony server 810, a PSTN 820 associated with the telephony server 810, a customer network 830, and an IC PSTN 840 associated with the customer network 830.

The telephony server 810 may be the telephony server 112 shown in FIG. 1. The telephony server 810 includes a PBX 812, which may be a cloud-based PBX system, an SBC 814, and a data store shown as directory 816. The directory 816 may be configured to store and manage the device extensions of the native devices of the customer network 830. The PBX 812 may be referred to as a native PBX. As shown in FIG. 8, the PBX 812 is communicatively coupled to the SBC 814 and the directory 816. The SBC 814 can act as an intermediary to transmit and receive SIP requests and responses between clients (i.e., native) or non-client (i.e., non-native) devices of a given customer with clients or non-client devices external to that customer. The SBC 814 is communicatively coupled to the PBX 812 and the PSTN 820. The PSTN 820 may support a native carrier associated with the telephony server 810.

The customer network 830 may be associated with an IC, a native carrier, or both. The customer network 830 includes a call manager 832, a telephone gateway/SBC 834, an internet gateway 836, and a data store 838, such as an IDP or AD. The data store 838 may be configured to store and manage the device extensions of the non-native devices of the customer network 830. The data store 838 may be configured to synchronize data with the directory 816 to manage the device extensions of the native devices of the customer network 830. The synchronization may be performed manually or via an integration with the IDP or AD. As shown in FIG. 8, the call manager 832 is communicatively coupled to non-native devices 850A, 850B. The call manager 832 may be a third party call control, a unified communications manager, or the like. One call manager is shown for simplicity and clarity, and it is understood that multiple call managers may be implemented, for example for multiple premise customers such as customers having a call manager for North American extensions and another call manager for Eastern European extensions. Non-native devices 850A, 850B may be non-native phones that are non-VoIP-enabled devices. The non-native devices 850A, 850B may be referred to as legacy devices or legacy phones of the customer network 830. Two non-native devices 850A, 850B are shown for simplicity and clarity, and it is understood that the customer network 830 may include any number of non-native devices. The internet gateway 836 is communicatively coupled to native devices 860A, 860B. The internet gateway 836 may be a VoIP gateway device that uses internet protocols to transmit and receive voice communications. Native devices 860A, 860B may be associated with telephony server 810. Two native devices 860A, 860B are shown for simplicity and clarity, and it is understood that the customer network 830 may include any number of non-native devices. Native devices 860A, 860B may be VoIP-enabled devices, and may be associated with a native carrier. The native devices 860A, 860B may be any one of the desk phone 304, the computer 306, the mobile device 308, or the shared device 310 shown in FIG. 3.

The telephone gateway/SBC 834 is communicatively coupled to the IC PSTN 840 and the call manager 832. The IC PSTN 840 may support any non-native carrier associated with the customer network 830. Examples of non-native carriers may include AT&T, Verizon, and the like. As shown in FIG. 8, the SBC 814 and the telephone gateway/SBC 834 may communicate via SIP trunk 870. For simplicity and clarity, FIG. 8 is shown with one SIP trunk 870 and it is understood that the native device hybrid system 800 may include multiple SIP trunks, and the SIP trunks may be grouped into a SIP group to identify which SIP trunk to use for a given non-native device/number/extension. The SIP trunk 870 may be used for IC and hybrid call routing. The directory 816 and data store 838 are synchronized to create a unified directory to manage non-native devices 850A, 850B and native devices 860A, 860B on the customer network 830. The unified directory may be used to support a native device having multiple phone numbers, for example an extension number to use for internal calls within the customer network, one phone number associated with the PSTN 820 to use for a call with a native device, and a different phone number associated with the IC PSTN 740 to use for a call with a non-native device.

In the example shown in FIG. 8, native device 850A may utilize a path to the PSTN 820 over the SIP trunk 870 using a native calling plan on an extension that is not part of the native platform (i.e., not in the directory 816). In this example, existing numbers of the non-native devices 850A, 850B may be ported into the directory 816 and assigned to external contact numbers through a SIP group. The non-native device extensions are synchronized via channel 880 and mapped between the data store 838 and the directory 816 such that they are routed through the SIP trunk 870. The synchronization may be performed manually or via a directory integration between the directory 816 and the data store 838. The integration may use protocols such as system for cross-domain identity management (SCIM) and security assertion markup language (SAML), for example.

Non-native device 850A may initiate a call with native device 860A or an external device (not shown) that is not associated with the customer network 830. As shown in FIG. 8, a call is placed by non-native device 850A and routed via the call manager 832 through the telephone gateway/SBC 834. The telephone gateway/SBC 834 is configured to route the call to the SBC 814 via the SIP trunk 870.

The SBC 814 is configured to obtain the mapped extensions from the directory 816 via the PBX 812. If the PSTN destination of the call is an external device that is not associated with the customer network 830, the SBC 814 is configured to route the call to the PSTN 820. If the PSTN destination of the call is an internal destination, such as native device 860A, the SBC 814 is configured to route the call to the native device 860A through the PBX 812 and internet gateway 836.

Figure 9:
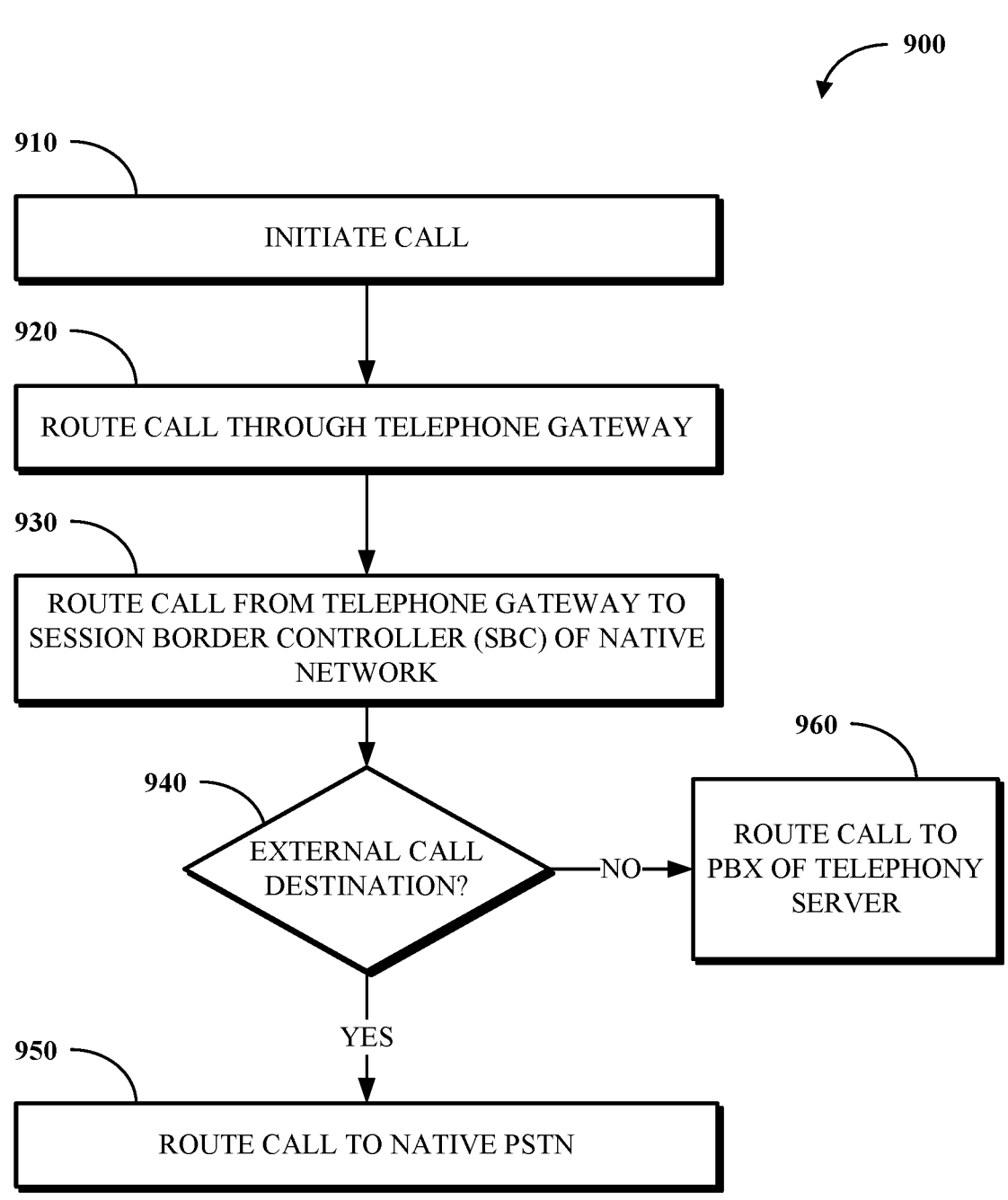
FIG. 9 is a flowchart of an example of a technique for routing a call for a non-native device over a native device hybrid system.

To further describe some implementations in greater detail, reference is next made to examples of techniques which may be performed by or using a UCaaS system. FIG. 9 is a flowchart of an example of a technique 900 for routing a call for a non-native device over a native device hybrid system. The technique 900 can be executed using computing devices, such as the systems, hardware, and software described with respect to FIGS. 1-8. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 910, a call may be initiated via a non-native device. The non-native device may be a device that is not associated with customer network. At 920, the call may be routed through a telephone gateway of the customer network, such as telephone gateway/SBC 834 shown in FIG. 8. At 930, the call may be routed from telephone gateway to the SBC of a telephony server associated with a native network. The call may be routed to the SBC via a SIP trunk.

At 940, the SBC may determine whether the call is intended for an external destination. In some examples, the SBC may obtain mapped extensions from a directory via a PBX of the telephony server. At 950, if the PSTN destination of the call is an external device that is not associated with the customer network, the SBC may route the call to a native PSTN, such as PSTN 820 shown in FIG. 8. At 960, if the PSTN destination of the call is an internal destination, the SBC is configured to route the call to the native device through the PBX of the telephony server.

Figure 10:
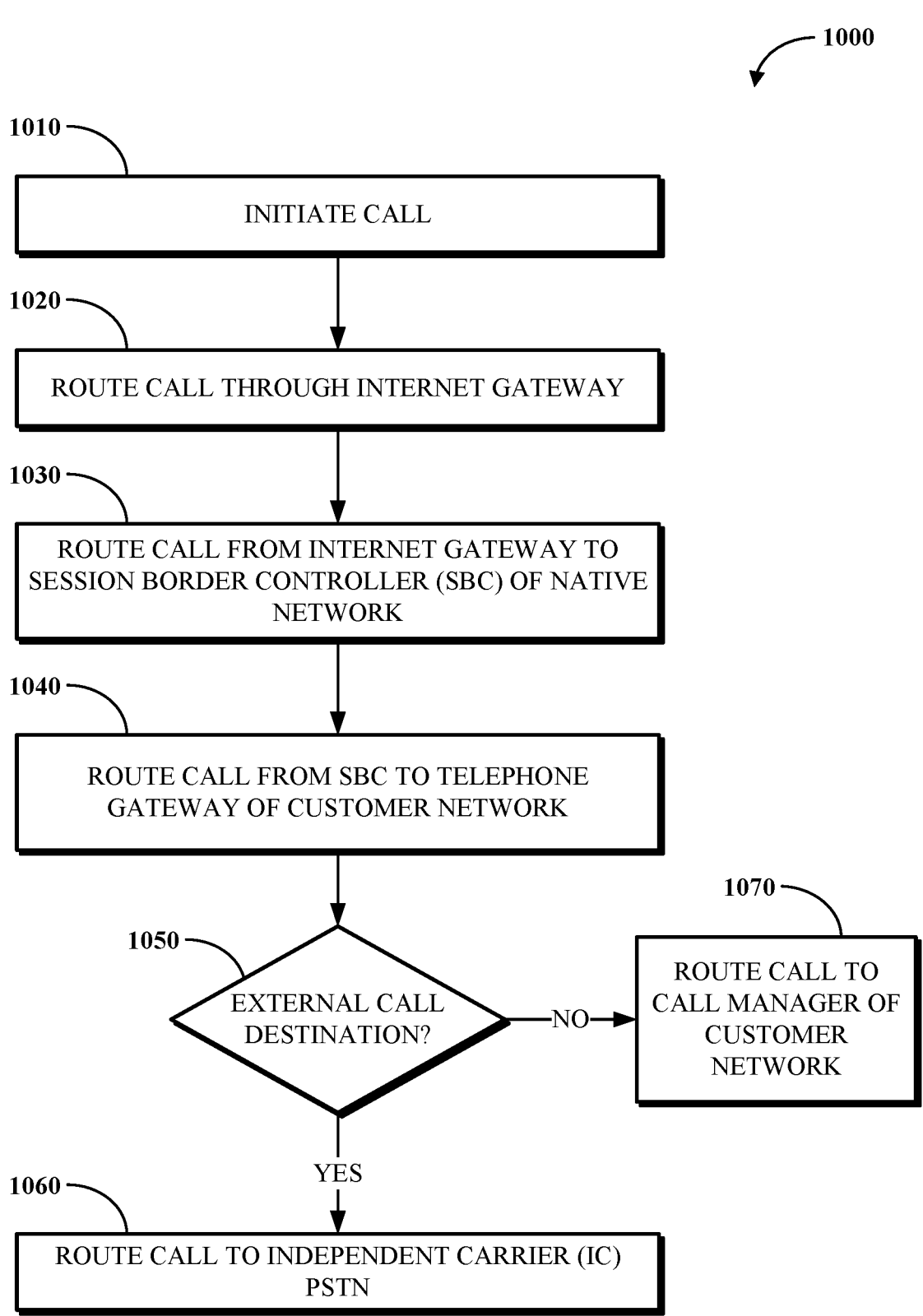
FIG. 10 is a flow chart of an example of a technique for routing a call for a native device over a native device hybrid system.

FIG. 10 is a flowchart of an example of a technique 1000 for routing a call for a native device over a native device hybrid system. The technique 1000 can be executed using computing devices, such as the systems, hardware, and software described with respect to FIGS. 1-8. The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1010, a call may be initiated via a native device. The native device may be a device that is associated with a native network for use on a customer network. At 1020, the call may be routed through an internet gateway of the customer network, such as internet gateway 836 shown in FIG. 8. At 1030, the call may be routed from the internet gateway to an SBC of a telephony server associated with the native network. At 1040, the call may be routed from the SBC to a telephone gateway of the customer network, such as telephone gateway/SBC 834 shown in FIG. 8. The call may be routed to the telephone gateway via a SIP trunk.

At 1050, the telephone gateway may determine whether the call is intended for an external destination. At 1060, if the PSTN destination of the call is an external device that is not associated with the customer network, the telephone gateway may route the call to an IC PSTN, such as PSTN 840 shown in FIG. 8. At 1070, if the PSTN destination of the call is an internal destination, the telephone gateway is configured to route the call to the non-native device through the call manager.

An aspect includes a method for routing a call to a first device associated with a first carrier of a network. The method may include routing the call from a second device associated with a second carrier of the network through a PBX via an internet gateway. The method may include routing the call from an SBC to the first device via a SIP trunk.

An aspect includes a system comprising a network that is associated with a first carrier and a second carrier and a telephony server. The network may include a first device associated with the first carrier and configured to communicate with a telephone gateway. The network may include a second device associated with the second carrier and configured to communicate with an internet gateway. The telephony server may be associated with the second carrier and include a PBX configured to route a call from the second device via the internet gateway. The telephony server may include an SBC configured to route the call to the first device via a SIP trunk.

An aspect includes a non-transitory computer-readable medium comprising instructions for routing a call to a first device associated with a first carrier of a network, that when executed by a processor, cause the processor to perform operations. The operations may include routing the call from a second device associated with a second carrier of the network through a PBX via an internet gateway. The operations may include routing the call from an SBC to the first device via a SIP trunk.

In one or more aspects, the call may be routed from the SBC to a native PSTN when the call is destined for an external device that is not associated with the network. In one or more aspects, the first device may be a native device associated with the network. In one or more aspects, the PBX may be a cloud-based PBX. In one or more aspects, the first device may be a native device associated with the network. In one or more aspects, the native device may be a VoIP device. In one or more aspects, the first device may be a non-VoIP device. In one or more aspects, the second device may be a VoIP device. In one or more aspects, the network may include a first data store configured to store first device extensions of non-native devices associated with the network. In one or more aspects, the telephony server may include a second data store configured to store second device extensions of native devices associated with the network. In one or more aspects, the second data store may be configured to synchronize data with the first data store to create a unified directory to manage the non-native devices and the native devices. In one or more aspects, the second data store may be configured to map the first device extensions to respective external contact numbers. In one or more aspects, the PBX may be associated with a native network. In one or more aspects, the call may be routed to an IC PSTN when the call is destined for an external device that is not associated with the network. In one or more aspects, the call may be routed to a call manager of the network when the call is destined for a native device associated with the network. In one or more aspects, the second device may have a non-native carrier number.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   dynamically determining, at call setup, a routing path for a call based on a real-time synchronized unified directory that maps extensions and numbers across native devices and non-native devices, wherein the unified directory is updated in real-time as unified directory mappings change;

routing the call from a first device associated with a first carrier of a network through a private branch exchange (PBX) via an internet gateway configured to communicate directly with the first device;

routing the call from a session border controller (SBC) communicatively coupled to the PBX via a session initiation protocol (SIP) trunk based on the determined routing, wherein the SBC is an intermediary that dynamically routes calls between the native devices and the non-native devices based on the unified directory; and routing the call to a second device associated with a second carrier of the network via a call manager associated with the second carrier.

2. The method of claim 1, further comprising:

routing the call from the SBC to a native public switched telephone network (PSTN) when the call is destined for an external device that is not associated with the network.

3. The method of claim 1, wherein the second device is a native device associated with the network.

4. The method of claim 1, wherein the PBX is a cloud-based PBX.

5. The method of claim 1, wherein the second device is a voice-over-internet protocol (VoIP) device.

6. A system, comprising:

a network associated with a first carrier and a second carrier, the network comprising:

a first device associated with the first carrier and configured to communicate with a telephone gateway; and a second device associated with the second carrier and configured to communicate directly with an internet gateway; and a telephony server associated with the second carrier configured to dynamically determine, at call setup, a routing path for a call based on a real-time synchronized unified directory that maps extensions and numbers across native devices and non-native devices, wherein the unified directory is updated in real-time as unified directory mappings change, the telephony server comprising:

a private branch exchange (PBX) configured to route the call from the second device via the internet gateway;

a session border controller (SBC) communicatively coupled to the PBX and configured to route the call via a session initiation protocol (SIP) trunk based on the determined routing, wherein the SBC is an intermediary that dynamically routes calls between the native devices and the non-native devices based on the unified directory; and a call manager configured to route the call to the first device.

7. The system of claim 6, wherein the PBX is a cloud-based PBX system.

8. The system of claim 6, wherein the first device is a non-voice-over-internet protocol (VoIP) device.

9. The system of claim 6, wherein the second device is a voice-over-internet protocol (VoIP) device.

10. The system of claim 6, wherein the network further comprises a first data store configured to store first device extensions of non-native devices associated with the network.

11. The system of claim 10, wherein the telephony server further comprises a second data store configured to store second device extensions of native devices associated with the network.

12. The system of claim 11, wherein the second data store is configured to synchronize data with the first data store to create the unified directory to manage the non-native devices and the native devices.

13. The system of claim 12, wherein the second data store is configured to map the first device extensions to respective external contact numbers.

14. A non-transitory computer-readable medium comprising instructions that when executed by a processor, cause the processor to perform operations comprising:

dynamically determining, at call setup, a routing path for a call based on a real-time synchronized unified directory that maps extensions and numbers across native devices and non-native devices, wherein the unified directory is updated in real-time as unified directory mappings change;

routing the call from a first device associated with a first carrier of a network through a private branch exchange (PBX) via an internet gateway configured to communicate directly with the first device;

routing the call from a session border controller (SBC) communicatively coupled to the PBX via a session initiation protocol (SIP) trunk based on the determined routing, wherein the SBC is an intermediary that dynamically routes calls between the native devices and the non-native devices based on the unified directory; and routing the call to a second device associated with a second carrier of the network via a call manager associated with the second carrier.

15. The non-transitory computer-readable medium of claim 14, wherein the PBX is associated with a native network.

16. The non-transitory computer-readable medium of claim 14, wherein the PBX is a cloud-based PBX.

17. The non-transitory computer-readable medium of claim 14, wherein the operations further comprise:

routing the call to an independent carrier (IC) public switched telephone network (PSTN) when the call is destined for an external device that is not associated with the network.

18. The non-transitory computer-readable medium of claim 14, wherein the operations further comprise:

routing the call to the call manager of the network when the call is destined for a native device associated with the network.

19. The non-transitory computer-readable medium of claim 14, wherein the first device is a voice-over-internet protocol (VoIP) device.

20. The non-transitory computer-readable medium of claim 14, wherein the first device has a non-native carrier number.

* * * * *